United States Patent
Aboulenein et al.

(10) Patent No.: US 6,792,496 B2
(45) Date of Patent: Sep. 14, 2004

(54) PREFETCHING DATA FOR PERIPHERAL COMPONENT INTERCONNECT DEVICES

(75) Inventors: Nagi Aboulenein, Portland, OR (US); Randy B. Osborne, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 387 days.

(21) Appl. No.: 09/922,235

(22) Filed: Aug. 2, 2001

(65) Prior Publication Data

US 2003/0028694 A1 Feb. 6, 2003

(51) Int. Cl.[7] .......................... G06F 12/00; G06F 13/00
(52) U.S. Cl. ...................... 710/306; 710/313; 711/167; 712/207
(58) Field of Search ............................... 710/305, 306, 710/311, 300, 107, 313; 707/10; 712/207; 709/102; 370/402; 711/100, 213, 167

(56) References Cited

U.S. PATENT DOCUMENTS

| | | | | |
|---|---|---|---|---|
| 5,822,788 A | * | 10/1998 | Kahn et al. | 711/213 |
| 5,829,042 A | * | 10/1998 | Leung | 711/147 |
| 5,915,104 A | * | 6/1999 | Miller | 710/310 |
| 5,983,306 A | * | 11/1999 | Corrigan et al. | 710/310 |
| 6,055,622 A | * | 4/2000 | Spillinger | 712/207 |
| 6,282,542 B1 | * | 8/2001 | Carneal et al. | 707/10 |

\* cited by examiner

Primary Examiner—Gopal C. Ray
(74) Attorney, Agent, or Firm—Fish & Richardson P.C.

(57) ABSTRACT

Prefetching data includes issuing a first request to prefetch data from a memory, receiving a response to the first request from the memory, obtaining a measure of latency between the first request and the response, and controlling issuance of a subsequent request to prefetch other data from the memory based on the measure.

39 Claims, 6 Drawing Sheets

PREFETCHING DATA FOR PERIPHERAL COMPONENT INTERCONNECT DEVICES

BACKGROUND

This invention relates to prefetching data for peripheral component interconnect devices.

A common computer task is the fetching of data by a data-consuming device (such as a peripheral card) from a place where the data is stored (such as a memory). Typically the consuming device is not connected directly to the memory, but rather is connected indirectly to the memory through a bridge, a bus such as a peripheral component interconnect (PCI) bus, and a memory controller.

In a simple case, when a consuming device needs data that is stored at a location in a region of the memory, the consuming device requests the data from the bridge, the bridge fetches the data through the bus and the memory controller, and the data is returned through the bus and the bridge to the consuming device. A delay (called latency) thus occurs between the time when the request is made and the time when the data arrives back at the consuming device.

Often, a data-consuming device will make a series of requests for data from successive locations in a single region of memory. The cumulative latency associated with the successive requests imposes a significant performance loss on the computer system.

In a common technique for reducing the latency loss, when a consuming device asks for data, the bridge fetches not only the requested data but also other data that is stored in the same memory region, based on the speculation that the consuming device may ask for the additional data in later requests. The fetching of data that has not yet been requested is called prefetching. If the consuming device requests the additional, prefetched data, the request can be served immediately from the bridge, eliminating much of the latency that would otherwise occur if requests had to be made to memory.

Prefetching works well if just the right amount of data is prefetched. Prefetching more data than the consuming device will actually use (called overshoot) wastes communication bandwidth because the prefetched data will be thrown away, and can, in fact, increase latency due to increased contention for memory.

On the other hand, if too little data is prefetched (called undershoot), the bridge will not be able to provide all the data the consuming device requests and thus the consuming device must incur the latency to access memory. When the bridge does not have the data requested by the consuming device, the bridge disconnects the PCI transaction and the consuming device must later retry the PCI transaction. This disconnect-retry cycle may repeat many times before the bridge gets the requested data from memory. Thus the consuming device polls the bridge by repeatedly retrying until the bridge has the necessary data. Because of the delay between the bridge receiving the data from memory and the consuming device retrying and finding the data, each disconnect adds latency due to polling overhead in addition to the latency for the bridge to acquire the data. Thus, it is important to minimize the number of disconnects for good performance.

Unfortunately the bridge does not know in advance how much data the consuming device will be requesting. Therefore, it would be useful to provide a prefetching algorithm that, on one hand, minimizes the number of disconnects triggered by lack of data in the prefetching bridge and, on the other hand, minimizes overshoot that prefetches more data than is actually used.

The two goals conflict, however, in that minimizing disconnects is achieved by aggressively prefetching plenty of data so that the consuming device never runs out, while minimizing overshoot is achieved by prefetching less data (zero data in the extreme case, which assures overshoot will never happen).

The algorithm of the invention balances the two conflicting requirements.

DESCRIPTION OF DRAWINGS

FIGS. 3, 3A, and 3B show registers.

DESCRIPTION

Figure 1:
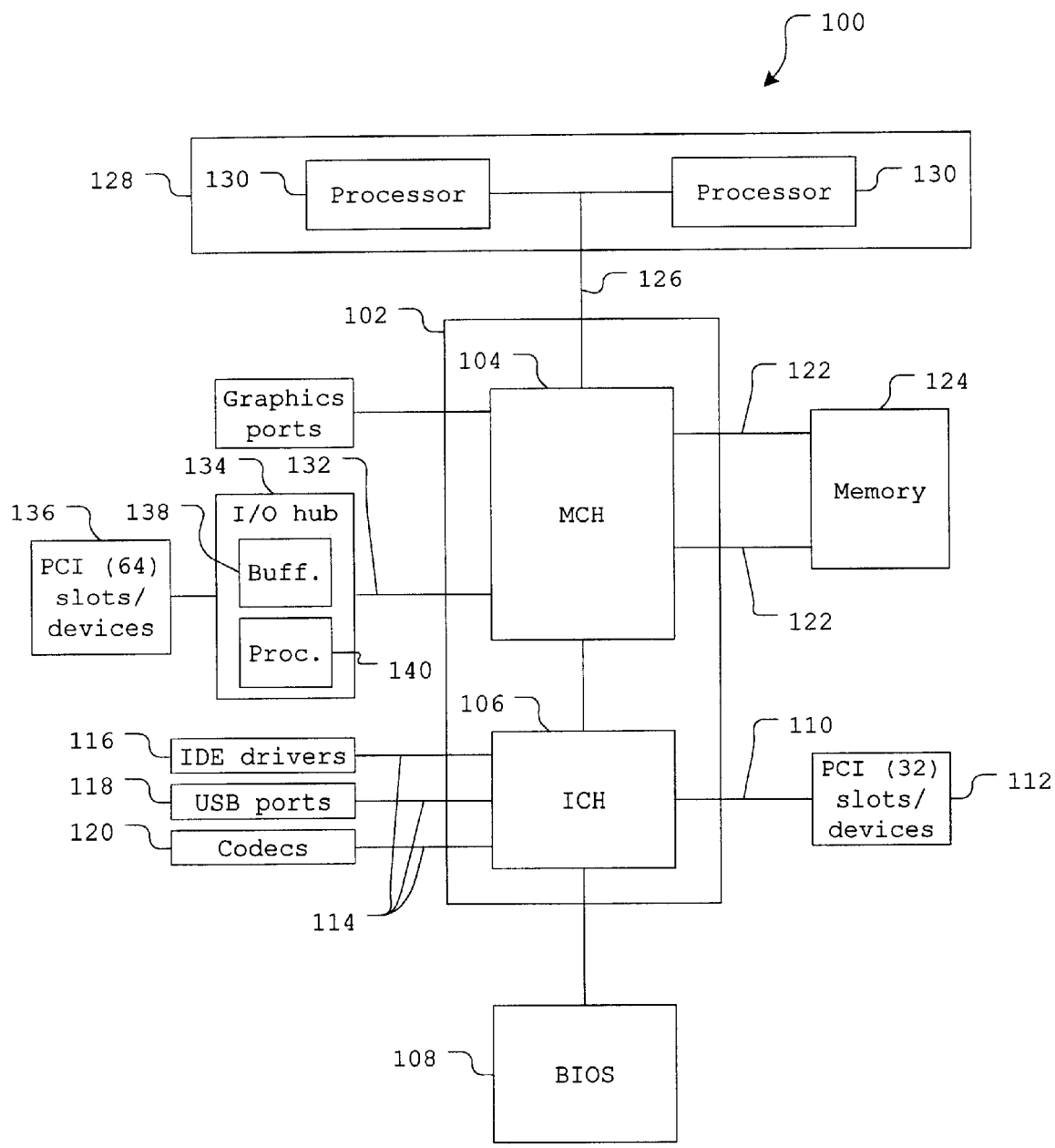
FIG. 1 is a block diagram of a processing system.

Referring to FIG. 1, an example of a system 100 that may be used in prefetching data is shown. The system 100 includes a peripheral component interconnect (PCI) hub link 132 that connects a memory controller hub (MCH) 104 with an I/O hub or PCI bridge 134, such as the Intel® 82806 PCI 64 Hub (P64H) or the Intel® P64H-2. The PCI bridge 134 supports I/O units 136, such as sixty-four bit and thirty-two bit PCI slots or devices 136. The PCI bridge 134 includes one or more buffers 138 that may store data prefetched from a memory 124 and stream size values, round-trip latencies, counters, and other similar data. Generally, the PCI bridge 134 associates a buffer 138 with each active PCI unit 136.

One of the PCI units 136 may signal the PCI bridge 134 that it desires data from the memory 124 starting at a particular memory address location. A PCI protocol used by the PCI unit 136 typically does not provide a way for the signaling PCI unit 136 to indicate to the PCI bridge 134 how much data the PCI unit 136 needs from the memory 124. The PCI bridge 134 typically fetches an initial amount of data from the memory 124 smaller than the expected amount of data desired by the PCI unit 136. If the PCI unit 136 needs more data, the PCI bridge 134 later fetches more data from the memory 124.

In a more detailed example, when the PCI unit 136 makes a request, the PCI bridge 134 responds either with the requested data or with a retry signal. In the former case, the PCI bridge 134 streams data to the PCI unit 136 until either the PCI bridge 134 runs out of available data or the PCI unit 136 acquires all the data it needs. If the PCI bridge 134 runs out of data, the PCI bridge 134 disconnects the PCI transaction, terminating the stream, and the PCI unit 136 must retry the transaction to acquire further data. Once the PCI unit 136 acquires all the data, it terminates streaming, leaving any further data that may have been fetched from memory in the PCI bridge 134. If the PCI unit 136 receives a retry signal, the PCI unit 136 waits a few clocks and then makes another request.

The PCI unit 136 may retry many times before the PCI bridge 134 is able to fetch data from the memory 124 and have data available to stream to the PCI unit 136. The PCI bridge 134 attempts to prefetch data from memory to minimize the latency in acquiring all the data. The objective may be to maintain streaming, avoiding disconnects due to the PCI bridge 134 running out of data—called prefetch undershoot—and to avoid fetching more data than the PCI unit 136 needs—called prefetch undershoot.

A variety of prefetch algorithms are possible. For example, the PCI bridge 134 may estimate how much data to fetch from the memory 124 for the requesting PCI unit 136. Alternatively, the PCI bridge 134 may make a first request for data to the memory 124, wait a number of clock cycles, and make another request for data to the memory 124 starting at a memory location following the last requested memory location in the first request for data. The PCI bridge 134 may continue and repeat this process any number of times, making a request for data, waiting a number of clock cycles, and making another request for data, until a certain amount of data has been prefetched from the memory 124. The number of clock cycles may be chosen so that the PCI bridge 134 can continuously stream data fetched from the memory 124 to the requesting PCI unit 136 once the PCI bridge 134 starts to stream data to the requesting PCI unit 136.

Given a round-trip latency from the PCI bridge 134 to the memory 124 and back, overshoot may result if successive prefetch requests are launched from the PCI bridge 134 to the memory 124 too rapidly. On the other hand, if successive prefetch requests are launched too infrequently, the PCI bridge 134 may lose connectivity with the requesting PCI unit 136 (i.e., be unable to continuously stream data to the requesting PCI unit 136).

With a process 140, the PCI bridge 134 may dynamically determine when to launch successive prefetch requests to the memory 124 based on, e.g., an estimate of the round-trip latency from the PCI bridge 134 to the memory 124 and back. Additionally, with the process 140, the PCI bridge 134 may dynamically determine the amount of data to request from the memory 124 in each successive prefetch request based on, e.g., previous amounts of data consumed by the requesting PCI unit 136.

Turning to other elements included in the system 100 before further discussing the process 140, a chipset 102 such as the Intel® 840 chipset can provide interfaces between a computer's subsystems (or the subsystems associated with the device that includes the system 100, such as a workstation or a server). The chipset 102 includes the MCH 104 such as the Intel® 82840 MCH and an input/output controller hub (ICH) 106 such as the Intel® 82801 ICH. The system 100 also includes a basic input/output system (BIOS) 108 which may or may not be included as part of the chipset 102.

Memory channels 122 connect the MCH 104 with the memory 124. The memory 124 may include dynamic random access memory (DRAM) or memory repeater hub (MRH). Each memory channel 122 may be able to accommodate its own DRAMs or MRHs.

A thirty-two bit PCI bus 110 connects the ICH 106 with PCI slots or devices 112 that may connect to thirty-two bit PCI devices or PCI add-ons. Buses 114 connect the ICH 106 with various I/O elements such as integrated drive electronics (IDE) controllers/drivers 116, Universal Serial Bus (USB) ports 118, compressors/decompressors (codecs) 120, and other similar elements.

A processor bus 126 connects the MCH 104 to a CPU 128 that may include one or more processors 130, e.g., Intel® Pentium processors.

Figure 2:
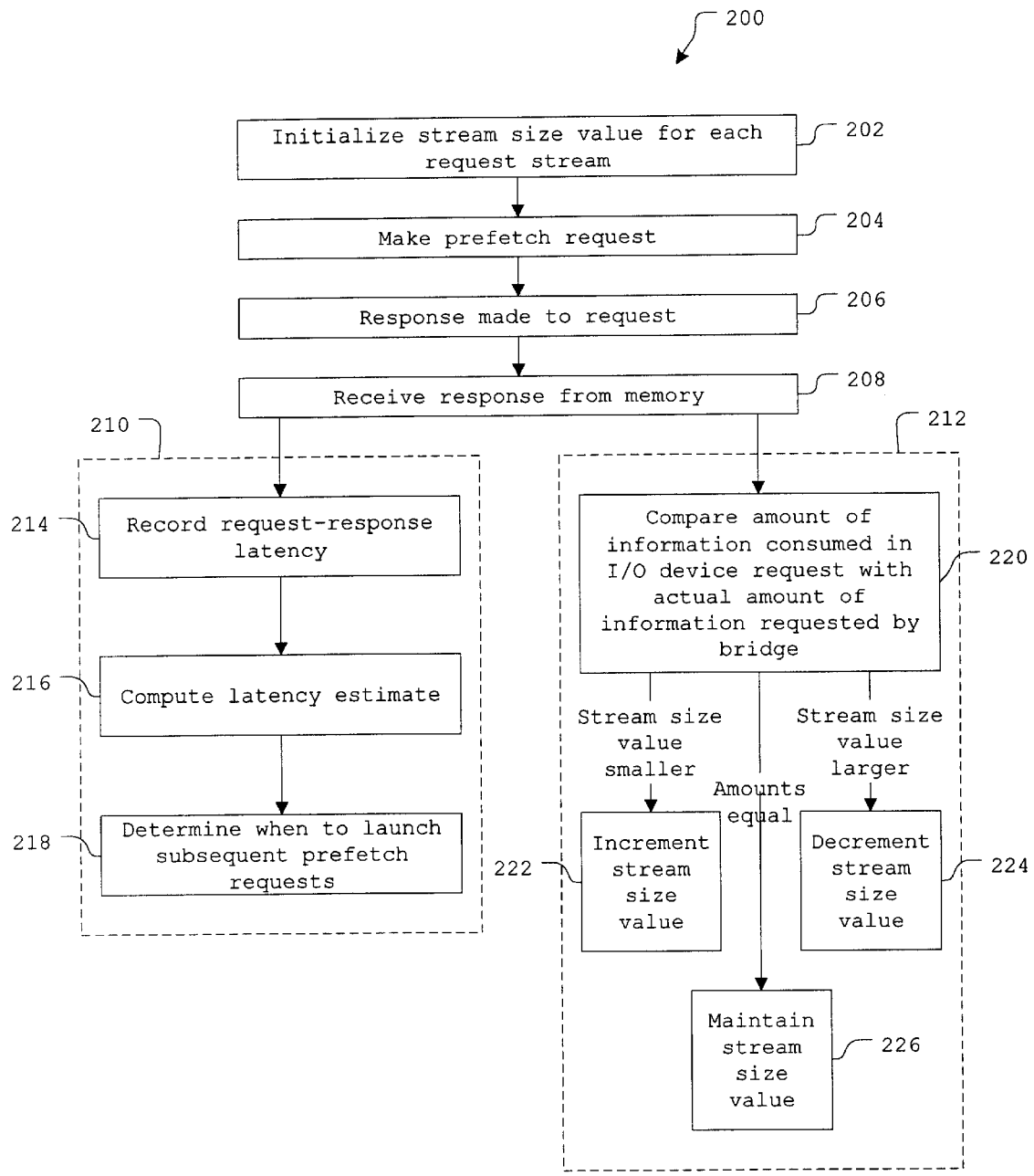
FIG. 2 is a flowchart showing a process of prefetching data.

Referring to FIG. 2, a prefetching process 200 illustrates an example of the process 140. Such a prefetching process can be executed for each stream of data that the PCI bridge 134 may handle. In the prefetching process 200, a stream size value is initialized 202 to a static value. The stream size value indicates the amount of data consumed by the requesting PCI unit 136 in the last series of PCI requests terminated by the PCI unit 136, as opposed to those terminated by the PCI bridge 134 disconnecting. The stream size value also indicates the amount of data for the PCI bridge 134 to request in its next request for data from the memory 124. Thus, the PCI bridge 134 can dynamically determine how much data to request from the memory 124 in successive requests for data based on at least one previous data transfer between the PCI bridge 134 and a PCI unit 136. In this way, the prefetching process 200 may reduce overshoot while maintaining the ability to tolerate long latencies.

The stream size value may be expressed in clock cycles, seconds, bits, bytes, or other similar size or time parameter. If the stream size value is expressed as a time parameter such as clock ticks, seconds, or any divisions or multiples thereof, the PCI bridge 134 requests data from the memory 124 for that length of time. If the stream size value is expressed as a size parameter such as bits, bytes, or any divisions or multiples thereof, the PCI bridge 134 requests that much data from the memory 124 over as much time as necessary. As noted above, the stream size value may change as the PCI bridge 134 completes requests (e.g., requests data from the memory 124 and receives the data back). In this way, the PCI bridge 134 can modify the aggressiveness of its data prefetching.

The stream size value's initial static value can be any preprogrammed value: an arbitrary value, an empirical value, a calculated estimate stream size value, or other similar value. In the case of multiple request streams, each stream size value's initial static value may vary.

For simplicity, only one stream size value is discussed with reference to the prefetching process 200 example; a stream size value may actually exist for each request stream supported by the PCI bridge 134, in which case the PCI bridge 134 can modify the aggressiveness of its data prefetching on a per-request-stream basis. A request stream generally refers to sets of data sequentially requested at consecutive memory locations.

The PCI bridge 134 makes 204 a prefetch request to the memory 124. The prefetch request is for an amount of data equal in time or size to the stream size value. The data can include computer-executable instructions, a combination of data and instructions, or other similar data. The memory 124 can include memory such as main memory, virtual memory, random-access memory (RAM), read-only memory (ROM), or other similar storage location. The memory 124 can be included in any device capable of maintaining the memory 124 such as a desktop computer, a mobile computer, a server, a workstation, a personal digital assistant, a telephone, a pager, or other similar device. These and other elements that may be used in implementing the prefetching process 200 are described further below.

The memory 124 responds 206 to the request by returning an amount of data. The PCI bridge 134 receives 208 the data and stores the data at the PCI bridge 134 (e.g., in the buffer 138) or at another storage location accessible by the PCI bridge 134. From the buffer 138 or the other storage location, the PCI bridge 134 can transmit the data to the requesting PCI unit 136.

The PCI bridge 134 can then perform a latency estimate process 210 and/or a stream prediction process 212. The PCI bridge 134 can use the latency estimate process 210 to help determine the timing of prefetch requests while using a static value for the size of each request. The PCI bridge 134 can use the stream prediction process 212 to determine the amount of data to prefetch in each prefetch request and send prefetch requests at regularly scheduled intervals. If the processes 210 and 212 are used together, the PCI bridge 134 can dynamically determine when to make prefetch requests and how much data to request in each request.

The PCI bridge 134 need not implement both the latency estimate process 210 and the stream prediction process 212 as part of the prefetching process 200. If the PCI bridge 134 does implement both processes 210 and 212, the PCI bridge 134 may perform the latency estimate process 210 and the stream prediction process 212 concurrently or sequentially. Typically, the PCI bridge 134 would perform the latency estimate process 210 before the stream prediction process 212 because while both the latency estimate process 210 and the stream prediction process 212 consider data regarding a full request-response cycle (round-trip latency and amount of data requested, respectively), the stream prediction process 212 needs additional data regarding the actual amount of data requested.

Turning to the latency estimate process 210 first, the PCI bridge 134 records 214 the round-trip latency for the request. That is, the PCI bridge 134 stores the amount of time in seconds, clock ticks, or other time measurement that lapsed between the time that the PCI bridge 134 made the request to the time that the PCI bridge 134 began to receive a response. The PCI bridge 134 may store the round-trip latency time in a memory location such as a cache, a register, a buffer, or other memory location.

Figure 3:
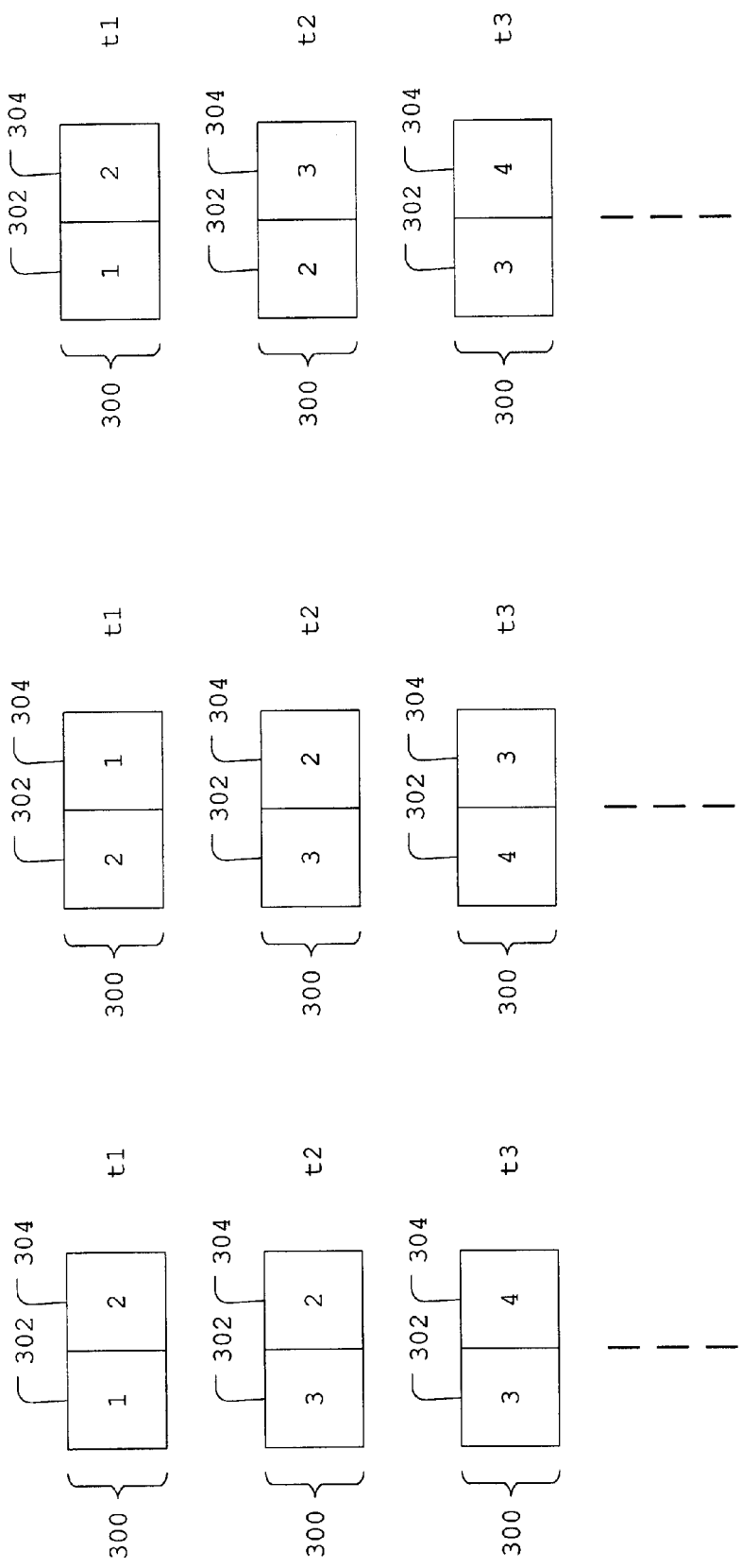

FIG. 3 shows an example of how the PCI bridge 134 may store successive round-trip latency times in a memory location 300 (e.g., the buffer 138). For simplicity in this example, the memory location 300 includes two registers 302 and 304; the memory location 300 could include any number (n) of registers (enough to store values for the previous n latencies). The registers 302 and 304 may form a shift register in that when the PCI bridge 134 stores a new round-trip latency at the memory location 300, a previously stored value is lost (except for possibly the first n latencies where the registers 302 and 304 may be initialized as empty).

For example, at a time t1, the PCI bridge 134 has made two requests for data and has stored the round-trip latency time for the first and the second requests in registers 302 and 304, respectively. At a time t2, the PCI bridge 134 has made a third request for data and has stored the third round-trip latency time in the register 302. At a time t3, the PCI bridge 134 has made a fourth request for data and has stored the fourth round-trip latency time in the register 304. This storage pattern continues for subsequent requests for data.

In another example, values may be stored at the memory location 300 so that the registers 302 and 304 function as a right-shift register (see FIG. 3A) or as a left-shift register (see FIG. 3B) where a new round-trip latency value is pushed into the memory location from the left or the right, respectively, thereby losing the right-most or left-most stored value, respectively, with each successive storage.

Returning to the latency estimate process 210 of FIG. 2, after storing the round-trip latency for the request, the PCI bridge 134 computes 216 a latency estimate from the stored round-trip latencies, actual round-trip latencies from previous requests. The PCI bridge 134 can dynamically determine when to launch the next prefetch request based on the latency estimate.

Figure 4:
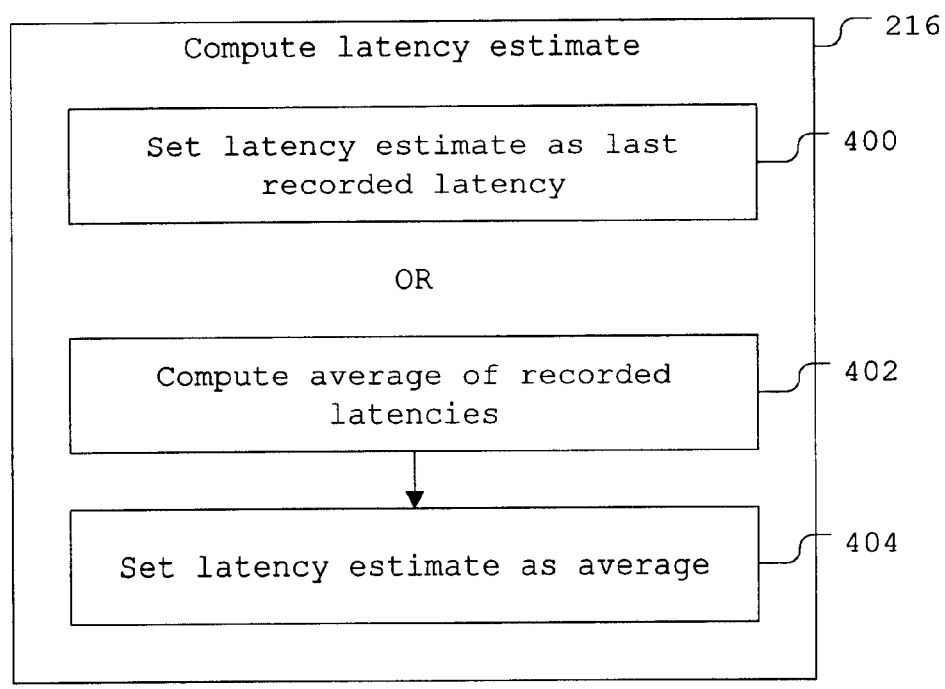
FIG. 4 is a flowchart showing a process of computing a latency estimate.

FIG. 4 shows examples of how the PCI bridge 134 may compute the latency estimate. In one example, the PCI bridge 134 may set 400 the latency estimate as the last recorded round-trip latency. In such a case, the PCI bridge 134 may use a minimal amount of storage space, e.g., one register, to store the round-trip latency for the most recent request for data.

In another example, the PCI bridge 134 may compute 402 an average of the previous n recorded round-trip latencies, where n can equal any integer greater than zero. This average may be a straight average or it may be a weighted average. In the case of a weighted average, the PCI bridge 134 may give more weight in the average calculation to more recently observed round-trip latency values.

The PCI bridge 134 may maintain a counter that the PCI bridge 134 increments with each made request for data to aid in calculating the average. (If the PCI bridge 134 is tracking multiple request streams, each request stream may have its own counter.)

The resources used to compute the latency estimate may vary. In the example of FIG. 3 where two registers 302 and 304 are used to store round-trip latencies for the previous two requests, the PCI bridge 134 could compute a straight average using the registers 302 and 304 and a simple adder, e.g., a half-adder, a full-adder, or other similar mechanism that can add the values stored in the two registers 302 and 304. Once an average is computed, the PCI bridge 134 can set 404 the latency estimate as the computed average.

Returning again to the latency estimate process 210 of FIG. 2, after computing the latency estimate, the PCI bridge 134 determines 218 when to launch subsequent prefetch requests based on the latency estimate. The PCI bridge 134 may take different actions based on how the latency estimate compares with a nominal round-trip latency.

Figure 5:
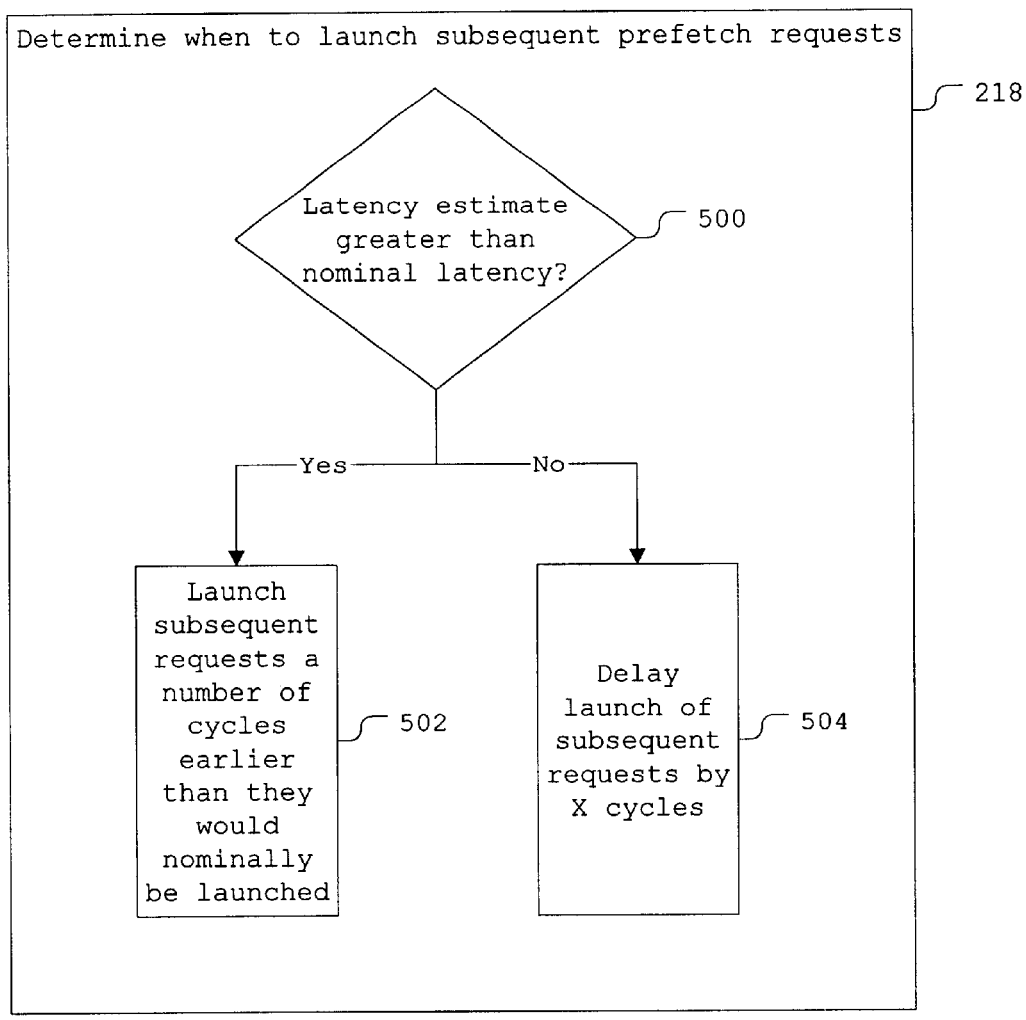
FIG. 5 is a flowchart showing a process of determining when to launch a prefetch request.

FIG. 5 shows an example of the actions that the PCI bridge 134 may take in determining when to launch subsequent prefetch requests. The PCI bridge 134 may determine 500 whether the latency estimate is greater than a nominal latency. If the latency estimate is greater than the nominal latency, then the PCI bridge 134 plans 502 to launch subsequent requests a number of clock cycles earlier than they would be nominally launched. This number may be a fixed amount such as a whole number of clock cycles, or it may be a calculated number such as the latency estimate minus the nominal latency. The number used (fixed or calculated) may be the same for all cases of the latency estimate exceeding the nominal latency or the number may vary, e.g., vary depending on the amount of difference between the latency estimate and the nominal latency. Expediting subsequent prefetch requests may enable the PCI bridge 134 to gather more data on a prefetch basis, e.g., before the data is actually requested.

If the latency estimate is less than the nominal latency, then the PCI bridge 134 plans 504 to delay launch of subsequent requests by a number of clock cycles. This number may be a fixed amount or a calculated number as described above (except that the calculated number, to be positive, would be the nominal latency minus the latency estimate). Delaying subsequent prefetch requests may prevent the PCI bridge 134 from making unnecessary prefetch requests.

If the latency estimate equals the nominal latency, then the PCI bridge 134 may launch the subsequent request after a nominal period.

Turning now to the stream prediction process 212, the PCI bridge 134 compares 220 the stream size value with an amount of data that the PCI unit 136 consumed in the last series of PCI requests that was terminated by the PCI unit 136. (If the stream size value is time-based rather than size-based, the PCI bridge 134 compares the time of the request with the stream size value.)

Generally, the stream prediction process 212 includes a built-in hysteresis that prevents the PCI bridge 134 from being confused by temporary spikes in the submitted request size for a particular request stream. If the stream size value is smaller than the amount of data consumed in the actual request, then the size (or time) prediction was too small. Thus, the PCI bridge 134 increments 222 the stream size value by a fixed amount or by a dynamically determined amount. If the stream size value is larger than the amount of data consumed in the actual request, then the size (or time) prediction was too large, so the PCI bridge 134 decrements 224 the stream size value by a fixed amount or a dynamically determined amount. If the stream size value equals the amount of data consumed in the actual request, then the PCI bridge 134 maintains 226 the stream size value, i.e., requests that same amount of data in the next prefetch request involving that request stream. The PCI bridge 134 may consider the stream size value equal to the amount of data consumed in the actual request if the amount of data consumed in the actual request is within a certain range above and/or below the stream size value.

The PCI bridge 134 may modify the stream prediction process 212 by adding logic to keep track of the average size of actual requests for the request stream (or for each request stream in the case of multiple request streams). If keeping track of the average actual request size, the PCI bridge 134 can support two modes of operation: aggressive prefetching (for large requests) and small prefetching (for small requests). If a request stream is predicted to make too small of a request, the PCI bridge 134 could use a small prefetch size, while for a request stream that has predominantly large request sizes, the PCI bridge 134 can use a more aggressive setting of prefetch sizes.

The PCI bridge 134 may determine whether a request stream is small or large based on previous history of each particular PCI unit 136. Alternatively, the PCI bridge 134 may be able to identify certain types or particular models of PCI units 136 and know that request sizes for the certain types or particular models are made in certain byte block sizes. Similarly, the BIOS 108 may program the PCI bridge 134 with data regarding the PCI units 136.

The prefetching process 200 is one implementation of a prefetching algorithm in accordance with the invention. The prefetching process 200 may be modified. For example, as mentioned above, the latency estimate process 210 and the stream prediction process 212 need not both be implemented as part of the prefetching process 200.

Figure 6:
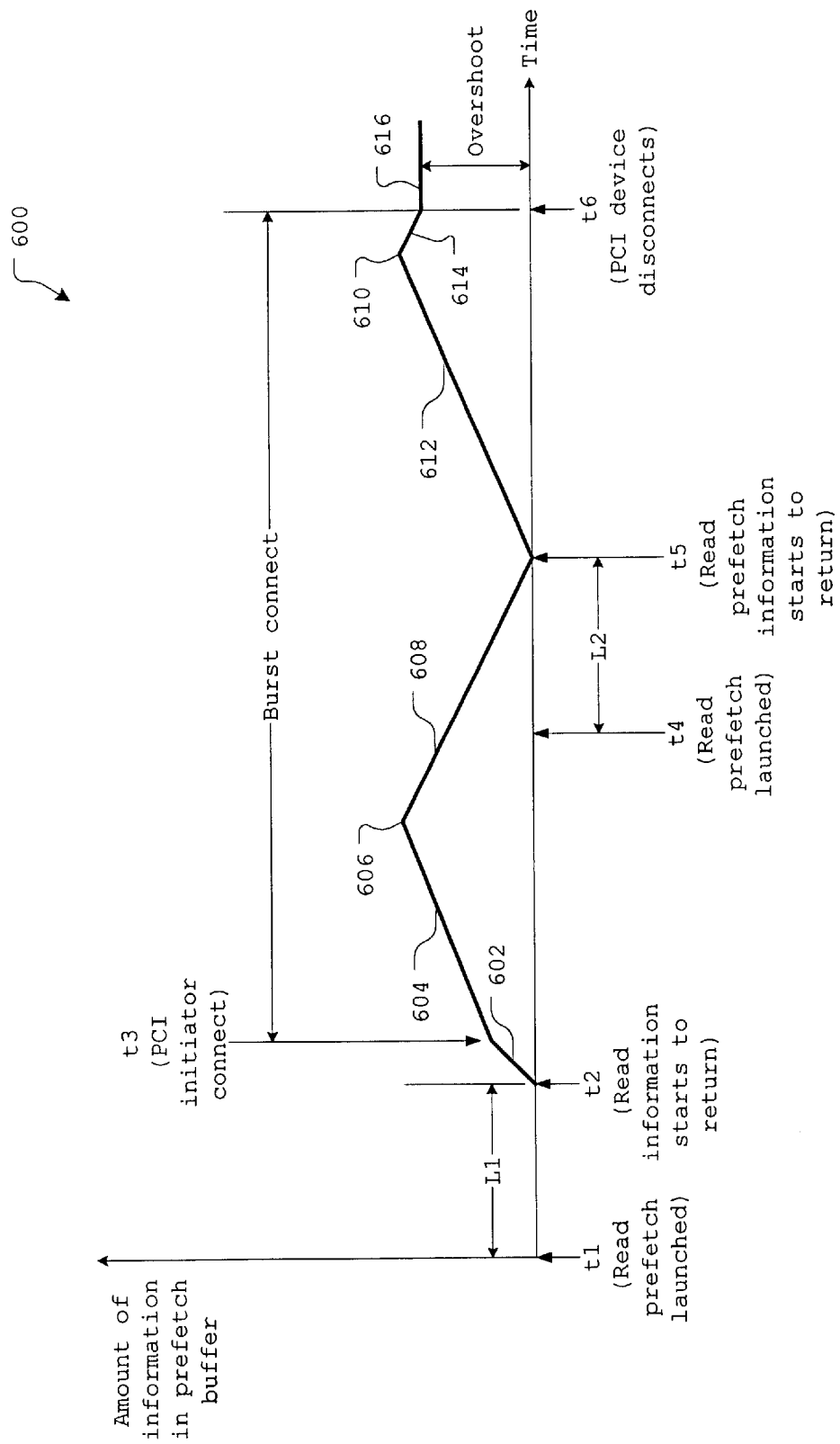
FIG. 6 is a graph showing timing of prefetching data.

Referring to FIG. 6, a graph 600 indicates an example prefetching scenario using the prefetching process 200 of FIG. 2 in the system 100 of FIG. 1. In this example, at a time t1 the PCI bridge 134 receives a request for data from one of the PCI devices 136 and the PCI bridge 134 requests data from the memory 124. The amount of data that the PCI bridge 134 requests from the memory 124 may be calculated as explained above with reference to FIG. 2. After a latency period L1, the PCI bridge 134 begins to receive data back from the memory 124 at a time t2. Data begins to collect in the buffer 138 at time t2, as indicated by the positive slope of a first line segment 602.

At a time t3, the PCI bridge 134 begins to stream data to the PCI device 136 that requested the data. Data continues to return to the PCI bridge 134 from the memory 124, as indicated by the positive slope of a second line segment 604. Note that the slope of the second line segment 604 is less than the slope of the first line segment 602 because while the PCI bridge 134 continues to store data from the memory in the buffer 138 after time t3, the PCI bridge 134 is also streaming data from the buffer 138 to the requesting PCI device 136.

At a peak point 606, the PCI bridge 134 has received the amount of data that it requested from the memory 124. Thus, the slope of a third line segment 608 has a negative slope as the PCI bridge 134 continues to stream data to the requesting PCI device 136.

The PCI bridge 134 launches a prefetch request to the memory 124 at a time t4 and, after a latency period L2, begins to receive data back from the memory 124 at a time t5 and to store the prefetched data in the buffer 138. Time t4 is chosen, by estimating L2 by the process described with FIG. 4, so that before the buffer 138 runs out of data at time t5, the PCI bridge 134 will have prefetched data from the memory 124 that the PCI bridge 134 can stream to the requesting PCI device 136. In this example, the latency period L2 is ideally timed (e.g., perfectly estimated) so that prefetched data reaches the PCI bridge 134 exactly at the time when the buffer 138 runs out of data fetched from the request launched to the memory 124 at time t1. In this way, the PCI bridge 134 can continuously stream data to the requesting PCI device 136 without losing connectivity with the requesting PCI device 136.

From time t5 to a second peak point 610, the PCI bridge 134 continues to stream data to the requesting PCI device 136 while the prefetched data collects in the buffer 138, as evidenced by the positive slope of a fourth line segment 612. At the second peak point 610, the PCI bridge 134 has received all of the requested prefetch data, so the slope of a fifth line segment 614 has a negative slope.

At a time t6, the requesting PCI device 136 terminates the transaction because the requesting PCI device 136 has received all of its currently desired data from the memory 124. The PCI bridge 134 thus stops streaming data to the requesting PCI device 136 at time t6. The time between times t3 and t6 can be considered a burst connect period, the time in which the PCI bridge 134 may stream data to the requesting PCI device 136 and request multiple sets of data for the requesting PCI device 136 at consecutive memory addresses from the memory 124.

Not all of the data prefetched from the memory 124 and stored in the buffer 138 was streamed to the requesting PCI device 136 in this example, as indicated by the zero slope and positive y-axis location of a sixth line segment 616. The amount of data remaining in the buffer 138 is the overshoot. The PCI bridge 134 may clear the buffer 138 of this data or it may retain the data in case the requesting PCI device 136 (or other PCI device 136) subsequently requests the data.

At a lower level of detail, each request to the memory 124 by the PCI bridge 134 involves the initiation of a new data transfer using a Memory-Read-Multiple (MRM) operation. Note also that the PCI bridge 134 may identify actual data requests/transfers by using MRM commands.

If the requesting PCI device 136 is disconnected from the PCI bridge 134 during the data transfer, e.g., during the burst connect period, and later retries the data transfer, the retry is still considered to be part of the original request. For example, for PCI traffic, contents of the buffer 138 may be invalidated when certain events occur, e.g., page boundary crossing, processor-initiated writes, etc. In order to avoid confusing the stream prediction process 212 if this invalidation occurs, the PCI bridge 134 can recognize an event that causes a buffer invalidation and keep track of request sizes across such invalidation events. In this way, the PCI bridge 134 can know how much data the requesting PCI device 136 desires and can begin to prefetch the data without having to wait for the requesting PCI device 136 to signal the PCI bridge 134 for data after the buffer invalidation.

In another example, for Gigabit Ethernet traffic, requests to the PCI bridge 134 that would cross a 4K page boundary are typically broken into two consecutive requests (MRMs) by the requesting PCI device 136. By keeping track of the amount of data consumed by a request stream at the time of a stream termination, as well as the memory address at which the termination occurred, the PCI bridge 134 can recognize when a larger request is broken into two by the requesting PCI device 136 and can avoid resetting the stream size value associated with that request stream.

If the requesting PCI device 136 is disconnected, then the requesting PCI device 136 likely receives its requested data in a series of disconnected spurts of data rather than in one continuous stream of data. Receiving the data in spurts can have a detrimental impact on overall I/O performance, and using the latency estimate process 210 can help reduce these detrimental effects and improve overall I/O performance. With the latency estimate process 210, the PCI bridge 134 may use a more aggressive prefetch algorithm that launches prefetch requests early enough to allow for the data to be returned by the memory 124 before a disconnect occurs. However, a more aggressive prefetch algorithm may lead to larger prefetch overshoots, which in turn may reduce overall I/O performance, so the latency estimate process 210 attempts to reduce the number of disconnects without making the prefetch algorithm too aggressive. Using the stream prediction process 212 may also improve overall I/O performance by reducing prefetch overshoot.

The techniques described here are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, and similar devices that may each include a processor, a storage medium readable by the processor (including volatile and non-volatile memory and/or storage elements), at least one input device, and one or more output devices. Program code is applied to data entered using the input device to perform the functions described and to generate output data. The output data is applied to one or more output devices.

Each program may be implemented in a high level procedural or object oriented programming language to communicate with a machine system. However, the programs can be implemented in assembly or machine language, if desired. In any case, the language may be a compiled or interpreted language.

Each such program may be stored on a storage medium or device, e.g., compact disc read only memory (CD-ROM), hard disk, magnetic diskette, or similar medium or device, that is readable by a general or special purpose programmable machine for configuring and operating the machine when the storage medium or device is read by the computer to perform the procedures described in this document. The system may also be considered to be implemented as a machine-readable storage medium, configured with a program, where the storage medium so configured causes a machine to operate in a specific and predefined manner.

Other embodiments are within the scope of the following claims.

What is claimed is:

1. A method comprising:

issuing a first request to prefetch data from a memory;

receiving a response to the first request from the memory;

obtaining a measure of latency between the first request and the response;

controlling issuance of a subsequent request to prefetch other data from the memory based on the measure; and in which said controlling issuance of the subsequent request is also based on a measure of latency including an average of an amount of time between a prefetch request to prefetch data from the memory and a prefetch response from the memory for each of a plurality of prefetch requests occurring before the first request.

2. A method comprising:

issuing a first request to prefetch data from a memory;

receiving a response to the first request from the memory;

obtaining a measure of latency between the first request and the response;

controlling issuance of a subsequent request to prefetch other data from the memory based on the measure; and in which said controlling issuance of the subsequent request includes delaying issuance of the subsequent request by a number of clock cycles if the measure of latency is less than a nominal latency.

3. A method comprising:

issuing a first request to prefetch data from a memory;

receiving a response to the first request from the memory;

obtaining a measure of latency between the first request and the response;

controlling issuance of a subsequent request to prefetch other data from the memory based on the measure; and in which said controlling issuance of the subsequent request includes accelerating issuance of the subsequent request by a number of clock cycles if the measure of latency exceeds a nominal latency.

4. A method comprising:

issuing a first request to prefetch data from a memory;

receiving a response to the first request from the memory;

obtaining a measure of latency between the first request and the response;

controlling issuance of a subsequent request to prefetch other data from the memory based on the measure; and in which said controlling issuance of the subsequent request is performed dynamically.

5. An article comprising:

a machine-readable medium which stores machine-executable instructions, the instructions causing a machine to:

issue a first request to prefetch data from a memory;

receive a response to the first request from the memory;

obtain a measure of latency between the first request and the response;

control issuance of a subsqguent request to prefetch other data from the memory based on the measure; and in which controlling issuance of the subsequent request is also based on a measure of latency including an average of an amount of time between a prefetch request to prefetch data from the memory and a prefetch response from the memory for each of a plurality of prefetch requests occurring before the first request.

6. The article of claim 5 in which the average is a weighted average.

7. An article comprising:
a machine-readable medium which stores machine-executable instructions, the instructions causing a machine to:
issue a first request to prefetch data from a memory;
receive a response to the first request from the memory;
obtain a measure of latency between the first request and the response;
control issuance of a subsequent request to prefetch other data from the memory based on the measure; and
in which said controlling issuance of the subsequent request includes delaying issuance of the subsequent request by a number of clock cycles if the measure of latency is less than a nominal latency.

8. An article comprising:
a machine-readable medium which stores machine-executable instructions, the instructions causing a machine to:
issue a first request to prefetch data from a memory;
receive a response to the first request from the memory;
obtain a measure of latency between the first request and the response;
control issuance of a subsequent request to prefetch other data from the memory based on the measure; and
in which said controlling issuance of the subsequent request includes accelerating issuance of the subsequent request by a number of clock cycles if the measure of latency exceeds a nominal latency.

9. An article comprising:
a machine-readable medium which stores machine-executable instructions, the instructions causing a machine to:
issue a first request to prefetch data from a memory;
receives a response to the first request from the memory;
obtain a measure of latency between the first request and the response;
control issuance of a subsequent request to prefetch other data from the memory based on the measure; and
in which determining when to make the subsequent request is performed dynamically.

10. A method comprising:
issuing a prefetch request from a bridge to prefetch from a memory a first amount of data, the first amount being equal to a stored value;
receiving at the bridge and from a device a data request for data;
providing a second amount of data from the bridge to the device in response to the data request;
revising the stored value based on the stored value and the second amount of data;
issuing from the bridge a subsequent request after issuing the first request to prefetch from the memory a revised amount of data, the revised amount being equal to the stored value; and
in which said revising the stored value includes increasing the stored value if the second amount of data exceeds the stored value.

11. A method comprising:
issuing a prefetch request from a bridge to prefetch from a memory a first amount of data, the first amount being equal to a stored value;
receiving at the bridge and from a device a data request for data;
providing a second amount of data from the bridge to the device in response to the data request;
revising the stored value based on the stored value and the second amount of data;
issuing from the bridge a subsequent request after issuing the first request to prefetch from the memory a revised amount of data, the revised amount being equal to the stored value; and
in which said revising the stored value includes decreasing the stored value if the stored value exceeds the second amount of data.

12. A method comprising:
issuing a prefetch request from a bridge to prefetch from a memory a first amount of data, the first amount being equal to a stored value;
receiving at the bridge and from a device a data request for data;
providing a second amount of data from the bridge to the device in response to the data request;
revising the stored value based on the stored value and the second amount of data;
issuing from the bridge a subsequent request after issuing the first request to prefetch from the memory a revised amount of data, the revised amount being equal to the stored value; and
maintaining the stored value if the stored value equals the second amount of data.

13. A method comprising:
issuing a prefetch request from a bridge to prefetch from a memory a first amount of data, the first amount being equal to a stored value;
receiving at the bridge and from a device a data request for data;
providing a second amount of data from the bridge to the device in response to the data request;
revising the stored value based on the stored value and the second amount of data;
issuing from the bridge a subsequent request after issuing the first request to prefetch from the memory a revised amount of data, the revised amount being equal to the stared value; and
in which said revising the stored value includes changing the stored value by a fixed amount.

14. A method comprising:
issuing a prefetch request from a bridge to prefetch from a memory a first amount of data, the first amount being equal to a stored value;
receiving at the bridge and from a device a data request for data;
providing a second amount of data from the bridge to the device in response to the data request;
revising the stored value based on the stored value and the second amount of data;
issuing from the bridge a subsequent request after issuing the first request to prefetch from the memory a revised amount of data, the revised amount being equal to the stored value; and in which said revising the stored value includes changing the stored value by a dynamically determined amount.

15. A method comprising:

issuing a prefetch request from a bridge to prefetch from a memory a first amount of data, the first amount being equal to a stored value;

receiving at the bridge and from a device a data request for data;

providing a second amount of data from the bridge to the device in response to the data request;

revising the stored value based on the stored value and the second amount of data;

issuing from the bridge a subsequent request after issuing the first request to prefetch from the memory a revised amount of data, the revised amount being equal to the stored value; and in which said revising the stored value is also based on amounts of data provided to the device in response to a plurality of actual requests for data sent to the bridge, the actual requests being included in a request stream that includes the first request.

16. An article comprising:

a machine-readable medium which stores machine-executable instructions, the instructions causing a machine to:

issue a prefetch request from a bridge to prefetch from a memory a first amount of data, the first amount being equal to a stored value;

receive at the bridge and from a device a data request for data;

provide a second amount of data from the bridge to the device in response to the data request;

revise the stored value based on the stored value and the second amount of data;

issue from the bridge a subsequent request after issuing the first request to prefetch from the memory a revised amount of data, the revised amount being equal to the stored value; and in which said revising the stored value includes increasing the stored value if the second amount of data exceeds the stored value.

17. An article comprising:

a machine-readable medium which stores machine-executable instructions, the instructions causing a machine to:

issue a prefetch request from a bridge to prefetch from a memory a first amount of data, the first amount being equal to a stored value;

receive at the bridge and from a device a data request for data;

provide a second amount of data from the bridge to the device in response to the data request;

revise the stored value based on the stored value and the second amount of data;

issue from the bridge a subsequent request after issuing the first request to prefetch from the memory a revised amount of data, the revised amount being equal to the stored value; and in which said revising the stored value includes decreasing the stored value if the stored value exceeds the second amount of data.

18. An article comprising:

a machine-readable medium which stores machine-executable instructions, the instructions causing a machine to;

issue a prefetch request from a bridge to prefetch from a memory a first amount of data, the first amount being equal to a stored value;

receive at the bridge and from a device a data request for data;

provide a second amount of data from the bridge to the device in response to the data request;

revise the stored value based on the stored value and the second amount of data;

issue from the bridge a subsequent request after issuing the first request to prefetch from the memory a revised amount of data, the revised amount being equal to the stored value; and further comprising instructions causing a machine to maintain the stored value if the stored value equals the second amount of data.

19. An article comprising:

a machine-readable medium which stores machine-executable instructions, the instructions causing a machine to:

issue a prefetch request from a bridge to prefetch from a memory a first amount of data, the first amount being equal to a stored value;

receive at the bridge and from a device a data request for data;

provide a second amount of data from the bridge to the device in response to the data request;

revise the stored value based on the stored value and the second amount of data;

issue from the bridge a subsequent request after issuing the first request to prefetch from the memory a revised amount of data, the revised amount being equal to the stored value; and in which said revising the stored value includes changing the stored value by a fixed amount.

20. An article comprising:

a machine-readable medium which stores machine-executable instructions, the instructions causing a machine to:

issue a prefetch request from a bridge to prefetch from a memory a first amount of data, the first amount being equal to a stored value;

receive at the bridge and from a device a data request for data;

provide a second amount of data from the bridge to the device in response to the data request;

revise the stored value based on the stored value and the second amount of data;

issue from the bridge a subsequent request after issuing the first request to prefetch from the memory a revised amount of data, the revised amount being equal to the stored value; and in which said revising the stored value includes changing the stored value by a dynamically determined amount.

21. An article comprising:

a machine-readable medium which stores machine-executable instructions, the instructions causing a machine to:

issue a prefetch request from a bridge to prefetch from a memory a first amount of data, the first amount being equal to a stored value;

receive at the bridge and from a device a data request for data;

provide a second amount of data from the bridge to the device in response to the data request;

revise the stored value based on the stored value and the second amount of data;

issue from the bridge a subsequent request after issuing the first request to prefetch from the memory a revised amount of data, the revised amount being equal to the stored value; and in which said revising the stored value is also based on amounts of data provided to the device in response to a plurality of actual requests for data sent to the bridge, the actual requests being included in a request stream that includes the first request.

22. An apparatus comprising:

a storage area configured to store a saved amount of data indicating a latency; and a first mechanism configured to issue a first request at a first time to prefetch from a storage location a first amount of data, the first amount determined at least in part by the saved amount, obtain a length of time between the first time and a time that the first mechanism begins to receive a response to the first request, determine when to make a subsequent request to prefetch other data from the storage location based on the length of time, revise the saved amount based on a comparison of the saved amount and a consumed amount of data including at least part of the first amount of data prefetched by the first request; and a plurality of storage areas, each of the plurality of storage areas associated with a different request stream and configured to store an associated amount of data indicating a latency.

23. The apparatus of claim 22 in which revising the saved amount includes revising the associated saved amount associated with the request stream associated with the first request.

24. An apparatus comprising:

a storage area configured to store a saved amount of data indicating a latency; and a first mechanism configured to issue a first request at a first time to prefetch from a storage location a first amount of data, the first amount determined at least in part by the saved amount, obtain a length of time between the first time and a time that the first mechanism begins to receive a response to the first request, determine when to make a subsequent request to prefetch other data from the storage location based on the length of time, revise the saved amount based on a comparison of the saved amount and a consumed amount of data including at least part of the first amount of data prefetched by the first request; and in which the first mechanism includes an input/output bridge.

25. The apparatus of claim 24 in which the input/output bridge includes a peripheral component interconnect bridge.

26. An apparatus comprising:

a storage area configured to store a saved amount of data indicating a latency; and a first mechanism configured to issue a first request at a first time to prefetch from a storage location a first amount of data, the first amount determined at least in part by the saved amount, obtain a length of time between the first time and a time that the first mechanism begins to receive a response to the first request, determine when to make a subsequent request to prefetch other data from the storage location based on the length of time, revise the saved amount based on a comparison of the saved amount and a consumed amount of data including at least part of the first amount of data prefetched by the first request; and further comprising an input/output device configured to consume data prefetched by the first mechanism.

27. The apparatus of claim 26 in which the input/output device includes a peripheral component interconnect device.

28. An apparatus comprising:

a storage area configured to store a saved amount of data indicating a latency; and a first mechanism configured to issue a first request at a first time to prefetch from a storage location a first amount of data, the first amount determined at least in part by the saved amount, obtain a length of time between the first time and a time that the first mechanism begins to receive a response to the first request, determine when to make a subsequent request to prefetch other data from the storage location based on the length of time, revise the saved amount based on a comparison of the saved amount and a consumed amount of data including at least part of the first amount of data prefetched by the first request; and in which said revising the saved amount includes increasing the saved amount if the consumed amount exceeds the saved amount.

29. An apparatus comprising:

a storage area configured to store a saved amount of data indicating a latency; and a first mechanism configured to issue a first request at a first time to prefetch from a storage location a first amount of data, the first amount determined at least in part by the saved amount, obtain a length of time between the first time and a time that the first mechanism begins to receive a response to the first request, determine when to make a subsequent request to prefetch other data from the storage location based on the length of time, revise the saved amount based on a comparison of the saved amount and a consumed amount of data including at least part of the first amount of data prefetched by the first request; and in which revising the saved amount includes decreasing the saved amount if the saved amount exceeds the consumed amount.

30. An apparatus comprising:

a storage area configured to store a saved amount of data indicating a latency; and a first mechanism configured to issue a first request at a first time to prefetch from a storage location a first amount of data, the first amount determined at least in part by the saved amount, obtain a length of time between the first time and a time that the first mechanism begins to receive a response to the first request, determine when to make a subsequent request to prefetch other data from the storage location based on the length of time, revise the saved amount based on a comparison of the saved amount and a consumed amount of data including at least part of the first amount of data prefetched by the first request; and in which the revising is performed dynamically.

31. An apparatus comprising:

a storage area configured to store a saved amount of data indicating a latency; and a first mechanism configured to
   issue a first request at a first time to prefetch from a storage location a first amount of data, the first amount determined at least in part by the saved amount,
   obtain a length of time between the first time and a time that the first mechanism begins to receive a response to the first request,
   determine when to make a subsequent request to prefetch other data from the storage location based on the length of time,
   revise the saved amount based on a comparison of the saved amount and a consumed amount of data including at least part of the first amount of data prefetched by the first request; and in which the determining is performed dynamically.

32. A system comprising:

a memory configured to store data;

a register configured to store a saved amount of data indicating a latency; and an input/output (I/O) bridge configured to
   issue a first request at a first time to prefetch a first amount of data from the memory, the first amount being determined at least in part by the saved amount,
   determine a length of time between the first time and a time that the I/O bridge begins to receive a response to the first request from the memory,
   dynamically determine when to make a subsequent request to prefetch a second amount of data from the memory based on the length of time, the second amount being equal to the saved amount, and
   dynamically revise the saved amount based on a comparison of the saved amount and a consumed amount of data including at least part of the first data prefetched by the first request.

33. The system of claim 32 further comprising a plurality of registers, each of the plurality of registers associated with a different request stream and configured to store an associated amount of data indicating a latency.

34. The system of claim 33 in which dynamically revising the saved amount includes revising the associated stored amount associated with the request stream associated with the first request.

35. The system of claim 32 in which the input/output bridge includes a peripheral component interconnect bridge.

36. The system of claim 32 further comprising an input/output device configured to consume data prefetched by the input/output bridge.

37. The system of claim 36 in which the input/output device includes a peripheral component interconnect device.

38. The system of claim 32 in which dynamically revising the saved amount includes increasing the saved amount if the consumed amount exceeds the saved amount.

39. The system of claim 32 in which dynamically revising the saved amount includes decreasing the saved amount if the saved amount exceeds the consumed amount.

* * * * *